Patented Apr. 30, 1946

2,399,599

UNITED STATES PATENT OFFICE 2,399,599

5-UREIDO-1,2,4-OXADIAZOLES AND THEIR PREPARATION

Donald W. Kaiser, Riverside, Conn., assignor to American Cyanamid Company, New York, N. Y., a corporation of Maine No Drawing. Application May 9, 1944, Serial No. 534,804

14 Claims. (Cl. 260—307)

This invention relates to a new class of organic compounds, novel reaction products thereof, and to methods of preparing the same. More particularly, the invention relates to 5-ureido-1,2,4-oxadiazoles.

I have discovered that when an acyl dicyandiamide is mixed with hydroxylamine in a suitable liquid reaction medium, reaction occurs resulting in the formation of a new class of organic compounds which may be designated as 5-ureido-1,2,4-oxadiazoles. These new compounds have the following structural formula:

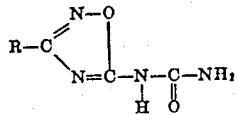

in which R is an alkyl, cycloalkyl, or aryl radical.

The compounds of the present invention are feebly acidic, white, crystalline solids slightly soluble in water, but more easily soluble in aqueous solutions of alkalis. In general, they are not easily soluble in organic solvents but may be dissolved in Cellosolve (ethylether of diethylene glycol), aliphatic alcohols, pyridine, etc. They melt or decompose at high temperatures, their melting points being somewhat dependent upon the manner in which they are determined.

The compounds of the present invention are useful for a variety of purposes: as dyestuff intermediates, in the preparation of pharmaceuticals, and in the preparation of other useful organic compounds. The new products of the present invention may be hydrolyzed to yield the corresponding 5-amino-1,2,4-oxadiazoles and 5-hydroxy 1,2,4-oxadiazoles and reacted with alcohols to yield the corresponding 5-carboalkyloxy-1,2,4-oxadiazoles.

The acyl dicyandiamides employed in the reaction of the present invention are prepared by simply mixing dicyandiamide with a desired acyl halide or anhydride and a water-soluble alkali metal hydroxide in the presence of a small amount of water and a non-hydroxylated solvent such as acetone.

A very great number of acyl dicyandiamides can be employed in the reaction described herein. Among these may be specifically mentioned: acetyl dicyandiamide, butyroyl dicyandiamide, caproyl dicyandiamide, lauroyl dicyandiamide, stearoyl dicyandiamide, α-bromcaproyl dicyandiamide, λ-nitrovaleroyl dicyandiamide, ω-hydroxy decanoyl dicyandiamide, sebacyl bis-dicyandiamide, adipyl bis-dicyandiamide, benzoyl dicyandiamide, p-nitro benzoyl dicyandiamide, o-carboxy benzoyl dicyandiamide, p-hydroxy benzoyl dicyandiamide, nicotinyl dicyandiamide, α-naphthoyl dicyandiamide, cyclohexyl acetyl dicyandiamide, hexahydro benzoyl dicyandiamide, and other alkyl, cycloalkyl, and aryl acyl dicyandiamides.

Hydroxylamine is a known compound usually available in the form of an acid salt. I may, however, use hydroxylamine solutions containing free hydroxylamine or the mono-acid salt such as hydroxylamine monohydrochloride, dihydroxylamine sulfate, etc.

A suitable solvent may be water alone or ethanol, methanol, dioxane, Cellosolve, or a mixture of these solvents with each other or with water. Although I usually dissolve the reactants before heating the reaction mixture, it is not necessary that they be completely dissolved. If desired, one of the reactants may be dissolved in a solvent and the other reactant added thereto in undissolved form.

When free hydroxylamine is employed, ammonia is evolved from the reaction mixture. When ordinary commercial hydroxylamine salts are used, the corresponding ammonia salts are formed along with the 5-ureido-1,2,4-oxadiazoles.

My invention will now be illustrated in greater detail by means of the following specific examples, in which representative acyl dicyandiamides are condensed with hydroxylamine under different conditions to yield 5-ureido-3-alkyl (and aryl)-1,2,4-oxadiazoles. It will be understood, of course, that these examples are given for purposes of illustration and are not to be considered as limiting my invention to the particular details described therein.

Example 1

To a suspension of 131.6 g. (0.70 mol) of benzoyl dicyandiamide in 1500 cc. of water was added a solution of 59 g. (0.85 mol) of hydroxylamine hydrochloride in 1500 cc. of water. The mixture was stirred and heated, but before reflux occurred the mass became so thick that an additional 500 cc. of water was added. After refluxing 30 minutes, the mixture was cooled, the colorless solid filtered, washed with water and allowed to dry. The yield of 5-ureido-3-phenyl-1,2,4-oxadiazole, which decomposed at 239–240° C. was 141 g. or 99%. Crystallization from dilute Cellosolve did not alter the decomposition point, although decomposition did vary with the rate of heating. The material was alkali soluble, and on analysis, values for carbon, hydrogen, and nitrogen checked closely with theoretical.

Example 2

A mixture of 63 g. (0.50 mol) of acetyl dicyandiamide, 49.2 g. (0.30 mol) of hydroxylamine sulfate and 150 cc. of water was stirred and refluxed for 40 minutes. During this time the solid changed in appearance and the liquid became brownish-red in color. The crude product, 5-ureido-3-methyl-1,2,4-oxadiazole decomposed when heated at 197–199° C. Crystallization from hot water raised the decomposition point of the amorphous-appearing solid to 206–207° C.

Example 3

Complete solution occurred after refluxing a stirred mixture of 91 g. (0.50 mol) of caproyl dicyandiamide, 49.2 g. (0.30 mol) of hydroxylamine sulfate, 500 cc. of water, and 400 cc. of Cellosolve. Heating was continued for 10 minutes, the solution poured into ice water, and the solid filtered. The dried solid, 5-ureido-3-amyl-1,2,4-oxadiazole, weighed 87 g. or a crude yield of 89%. Decomposition occurred at 179°–180° C., but a fusion with caproyl dicyandiamide, (M. P. 179–180° C.), melted at 155–160° C. Glittering plates were obtained after crystallization from dilute isopropanol and the decomposition point was raised to 185–196° C. The product was alkali soluble and on analysis for carbon, hydrogen and nitrogen gave values very close to theoretical.

Although the preceding examples employ the temperatures of the refluxing reaction mixtures, these temperatures were used merely as a matter of convenience. The reaction will take place at either higher or lower temperatures, for example, from about 25° C. to 120° C., or even higher. Of course, at the higher temperatures the reaction is completed in a shorter period of time.

I claim:

1. 5-ureido-1,2,4-oxadiazoles having the general formula

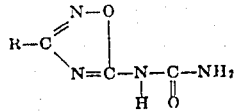

in which R is a member of the group consisting of alkyl, cycloalkyl and aryl radicals.

2. 5-ureido-1,2,4-oxadiazoles having the general formula

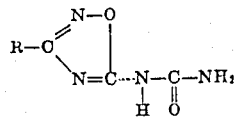

in which R is an alkyl radical.

3. 5-ureido-1,2,4-oxadiazoles having the general formula

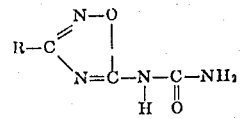

in which R is an aryl radical of the benzene series.

4. 3-phenyl-5-ureido-1,2,4-oxadiazole.
5. 3-methyl-5-ureido-1,2,4-oxadiazole.
6. 3-amyl-5-ureido-1,2,4-oxadiazole.
7. A method of preparing 5-ureido-1,2,4-oxadiazoles which comprises mixing together hydroxylamine and an acyl dicyandiamide.
8. A method of preparing 5-ureido-1,2,4-oxadiazoles which comprises mixing together hydroxylamine and an acyl dicyandiamide in a liquid reaction medium and heating the mixture until a 5-ureido-1,2,4-oxadiazole is formed.
9. A method of preparing 5-ureido-1,2,4-oxadiazoles which comprises mixing together in a solvent and heating hydroxylamine hydrochloride and an acyl dicyandiamide.
10. A method of preparing 5-ureido-1,2,4-oxadiazoles which comprises mixing together in a solvent and heating hydroxylamine sulfate and an acyl dicyandiamide.
11. A method of preparing 5-ureido-1,2,4-oxadiazoles which comprises mixing together an aqueous solution of hydroxylamine with an acyl dicyandiamide and heating the reaction mixture until a 5-ureido-1,2,4-oxadiazole has been formed.
12. A method of preparing 3-aryl-5-ureido-1,2,4-oxadiazole which comprises mixing together in a liquid reaction medium comprising water, hydroxylamine and an aryl acyl dicyandiamide.
13. A method of preparing 3-phenyl-5-ureido-1,2,4-oxadiazole which comprises mixing together in a liquid reaction medium comprising water, hydroxylamine and benzoyl dicyandiamide.
14. A method of preparing 3-alkyl-5-ureido-1,2,4-oxadiazole which comprises mixing together in a liquid reaction medium comprising water, hydroxylamine and an alkyl acyl dicyandiamide.

DONALD W. KAISER.